(12) United States Patent
Lin et al.

(10) Patent No.: US 11,534,995 B1
(45) Date of Patent: Dec. 27, 2022

(54) METHODS FOR FORMING IMAGE TRANSPORT LAYERS FOR ELECTRONIC DEVICES

(71) Applicant: Apple Inc., Cupertino, CA (US)

(72) Inventors: Wei Lin, Santa Clara, CA (US); Nathan K. Gupta, San Francisco, CA (US); Shubhaditya Majumdar, Santa Clara, CA (US); Prabhakar Gulgunje, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 16/904,456

(22) Filed: Jun. 17, 2020

Related U.S. Application Data

(60) Provisional application No. 62/870,632, filed on Jul. 3, 2019.

(51) Int. Cl.
*B29D 11/00* (2006.01)

(52) U.S. Cl.
CPC .. *B29D 11/00721* (2013.01); *B29D 11/00682* (2013.01)

(58) Field of Classification Search
CPC ............... B29D 11/00721; B29D 11/00682
See application file for complete search history.

(56) References Cited

U.S. PATENT DOCUMENTS

| | | |
|---|---|---|
| 3,982,916 A | 9/1976 | Miller |
| 5,639,512 A | 6/1997 | Nonaka et al. |
| 6,892,011 B2 | 5/2005 | Walker et al. |
| 10,052,831 B2 | 8/2018 | Welker et al. |
| 2005/0094954 A1 | 5/2005 | Pickrell et al. |
| 2006/0045444 A1 | 3/2006 | Miller et al. |
| 2018/0128973 A1* | 5/2018 | Powell ............... G02B 6/08 |
| 2020/0124746 A1* | 4/2020 | Welker ............... G01T 1/201 |

* cited by examiner

*Primary Examiner* — Mathieu D Vargot
(74) *Attorney, Agent, or Firm* — Treyz Law Group, P.C.; G. Victor Treyz; Joseph F. Guihan

(57) ABSTRACT

An electronic device may have a housing with a display. A protective display cover layer for the display may have an image transport layer such as an image transport layer formed from Anderson localization material. Anderson localization material may be formed using equipment such as heated molds, extrusion equipment, fusion tools, and fiber drawing equipment. The materials used to form a block of Anderson localization material may be polymers or other transparent materials. Elevated temperatures such as temperatures above the melting points of the polymers may be used during extrusion, fusion, drawing, and other operations.

12 Claims, 11 Drawing Sheets

METHODS FOR FORMING IMAGE TRANSPORT LAYERS FOR ELECTRONIC DEVICES

This application claims the benefit of provisional patent application No. 62/870,632, filed Jul. 3, 2019, which is hereby incorporated by reference herein in its entirety.

FIELD

This relates generally to electronic devices, and, more particularly, to optical structures for electronic devices.

BACKGROUND

Electronic devices may have displays. Displays have arrays of pixels for displaying images for a user. To prevent damage to the pixels, the pixels can be covered with a transparent display cover layer. If care is not taken, however, the inclusion of a display cover layer into an electronic device may cause the device to have larger inactive border regions than desired or may introduce undesired image distortion.

SUMMARY

An electronic device may have a housing with a display. The display may be covered with a protective display cover layer. To help enlarge the effective size of the display, the display cover layer may be formed from an image transport layer. The image transport layer may include a coherent fiber bundle or Anderson localization material. During operation, images presented to an inner input surface of the image transport layer are transported to and presented on a corresponding outer output surface of the image transport layer.

Blocks of Anderson localization material for the image transport layer may be formed using equipment such as heated molds, extrusion equipment, fusion tools, and fiber drawing equipment. The materials used to form the blocks of Anderson localization material may be polymers or other transparent materials. Elevated temperatures such as temperatures above the melting points of the polymers may be used during extrusion, fusion, drawing, and other operations. Processing equipment such as slicing equipment, grinding equipment, and polishing equipment may, if desired, be used in forming display cover layers from blocks of Anderson localization material.

DETAILED DESCRIPTION

An electronic device may have a display. The display may have an array of pixels for creating an image. The image may pass through a protective display cover layer that overlaps the array of pixels. It may be desirable to expand image size and/or to otherwise optically modify an image presented on the array of pixels. This can be accomplished using an image transport layer.

For example, to minimize display borders, the display cover layer may include an image transport layer formed from Anderson localization material or a coherent fiber bundle. The image transport layer may receive an image from a display at an input surface and may provide the image to a corresponding output surface for viewing by a user. The image transport layer may have a shape that helps expand the effective size of the image without imparting undesired distortion to the image and/or may have other configurations.

Figure 1:
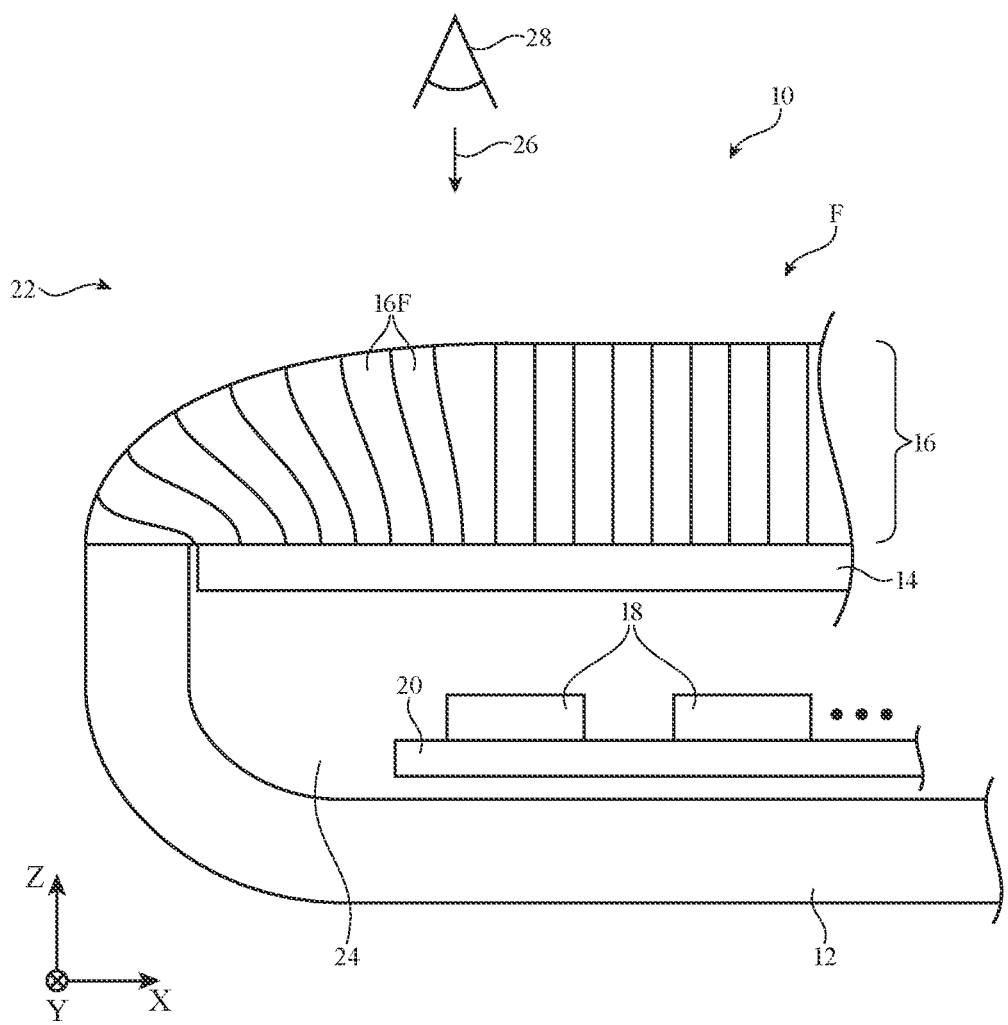
FIG. 1 is a side view of an illustrative electronic device with an image transfer layer overlapping a display in accordance with an embodiment.

A cross-sectional side view of a portion of an illustrative electronic device with a display cover layer that includes an image transport layer is shown in FIG. 1. In the example of FIG. 1, device 10 is a portable device such as a cellular telephone, wristwatch, or tablet computer. Other types of devices may have display cover layers with fiber optic plates, if desired.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may be sufficiently flexible to be bent. Displays for device 10 may have pixel arrays for displaying images for a user. Each pixel array (which may sometimes be referred to as a display panel, display substrate, or display) may be mounted under a transparent display cover layer that helps to protect the pixel array. In the example of FIG. 1, pixel array (display) 14 is mounted under image transport layer 16. Optional additional layers (e.g., transparent layers of glass, crystalline material such as sapphire, etc.) may be stacked above and/or below layer 16. Layer 16 and these additional layers may serve as a protective display cover layer (and may sometimes be referred to as forming a transparent portion of the housing for device 10). The configuration of FIG. 1 in which a display cover layer for device 10 is formed from layer 16 is illustrative.

During operation, the pixels of display 14 produce image light that passes through optical structures 16F in layer 16 for viewing by a user such as viewer 28 who is viewing device 10 in direction 26 (e.g., a user who is viewing device 10 straight on in a direction parallel to the surface normal of a planar central portion of layer 16 on front face F, a user who is viewing device 10 at an off-axis viewing angle such as at a 45° angle to the surface normal of a planar central portion of layer 16, or a user who is viewing device 10 in other directions). Structures 16F may be optical fibers (e.g., in scenarios in which layer 16 is a coherent fiber bundle) or other elongated optical features. For example, structures 16F may be filaments that have different refractive index values in scenarios in which layer 16 is a layer of Anderson localization material. Illustrative configurations in which layer 16 is a layer of Anderson localization material are sometimes described herein as an example.

Anderson localization material is characterized by transversely random refractive index features (e.g., higher index regions and lower index regions or regions of three or more or four or more different respective refractive indices) with a lateral size of about 300-500 nm, at least 100 nm, at least 700 nm, at least 1 micron, less than 5 microns, less than 1.5 microns, two wavelengths, or other suitable lateral size that are configured to exhibit two-dimensional transverse Anderson localization of light (e.g., the light output from the display of device 10). These refractive index variations are longitudinally invariant along the direction of light propagation and are generally perpendicular to the surface normal of a layer of Anderson localization material (e.g., the refractive index variations have filamentary shapes that run from the lower input surface of layer 16 of FIG. 1 to the upper output surface of layer 16 of FIG. 1) as illustrated by structures 16F. In some configurations, the filaments in an Anderson localization material may be bent, as shown by illustrative structures 16F near the edge of layer 16 of FIG. 1.

Anderson localization material (and, if desired, coherent fiber bundles) can be used to form plates or other optical members such as layer 16. The plates may be layers with a thickness of at least 0.2 mm, at least 0.5 m, at least 1 mm, at least 2 mm, at least 5 mm, less than 20 mm, or other suitable thickness. Anderson localization material may also be used to form other image transport structures (e.g., straight and/or bent elongated light pipes, spherical shapes, cones, tapered shapes, etc.). As shown in FIG. 1, the surfaces of image transport layers such a layer 16 may be planar and/or may have curved profiles (e.g., the edges of device 10 may have rounded outer surfaces). These surfaces may be formed by performing operations such as slicing operations, grinding operations, and polishing operations on blocks of Anderson localization material.

Figure 2:
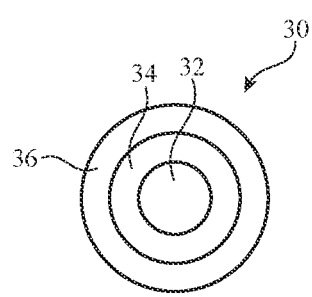
FIG. 2 is a cross-sectional view of an illustrative optical fiber in accordance with an embodiment.

In coherent fiber bundles, a set of fibers are fused together to form layer 16. An illustrative fiber is shown in FIG. 2. As shown in FIG. 2, fiber 30 may have a transparent core 32 and one or more layers such as layer 36 (e.g., a lower-index cladding) and layer 34 (e.g., a clear binder material, a stray light absorption layer, and/or other layers).

Figure 3:
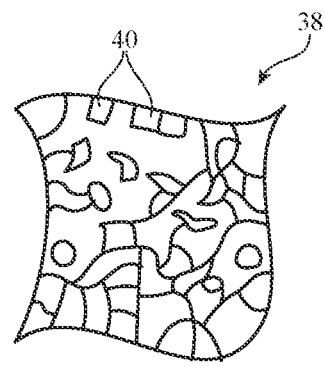
FIG. 3 is a cross-sectional view of illustrative Anderson localization material in accordance with an embodiment.
Figure 4:
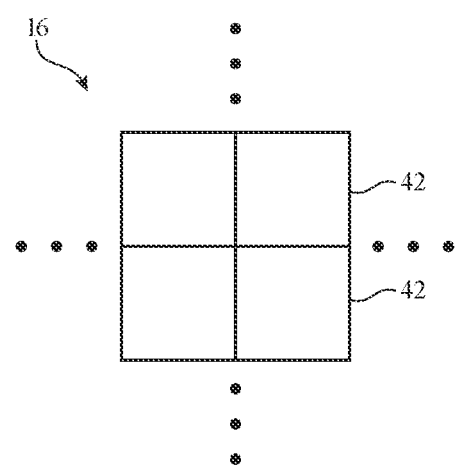
FIGS. 4 and 5 are top views of illustrative image transfer layers formed from multiple sections of material that have been joined together in accordance with embodiments.

Illustrative Anderson localization material for forming layer 16 is shown in FIG. 3. As shown in FIG. 4, Anderson localization material 38 contains a random (pseudorandom) set of elongated optical structures 40 (e.g., filaments with different refractive index values). The filaments are distributed laterally with a random (pseudorandom) pattern. Material 38 may contain elongated optical structures (e.g., filaments) with 2-4, at least 2, at least 3, at least 4, fewer than 6, fewer than 5, or other suitable number of different materials of different respective refractive index values.

Figure 5:
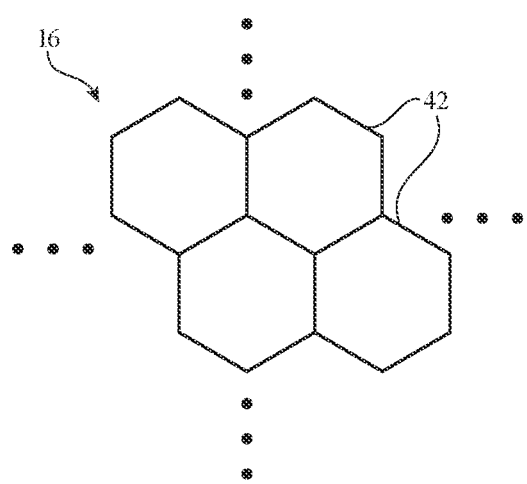

Using fusing equipment or other equipment for joining image transport layer structures, tiles of Anderson localization material 38 may be joined together to form layers covering enlarged areas. For example, image transport layer 16 of FIG. 1 may be formed from an array of rectangular tiles 42 as shown in FIG. 4 or hexagonal tiles 42 as shown in FIG. 5 (as examples). Blocks of Anderson localization equipment may also be formed by fusing together sets of fibers or other elongate strands of material. In some configurations, fibers that are fused together may contain filaments of different refractive index values.

Layer 16 may be formed from any suitable material such as polymer, glass, crystalline material such as sapphire, transparent ceramic, and/or other materials. Examples in which layer 16 is formed from polymer are sometimes described herein as an example. The polymer materials used in forming may be formed from glassy polymers such as polymethylmethacrylate (PMMA), polyester, or other amorphous polymers and/or may be formed from semicrystalline polymers such as fluoropolymers (e.g., THV or PVDF).

In some arrangements, polymer material may be extruded. Extrusion of glassy polymers may be performed at about 50° C. above the glass transition temperature of the polymer, which is about 105° C. for PMMA. Extrusion of semicrystalline polymers may be performed at about 30° C. above the melting point of the polymer (which is about 120-180° C. for THV and about 158° C. for PVDF, as examples). During extrusion at elevated temperatures, the polymer material is sufficiently soft to be relatively relaxed (low stress).

Figure 6:
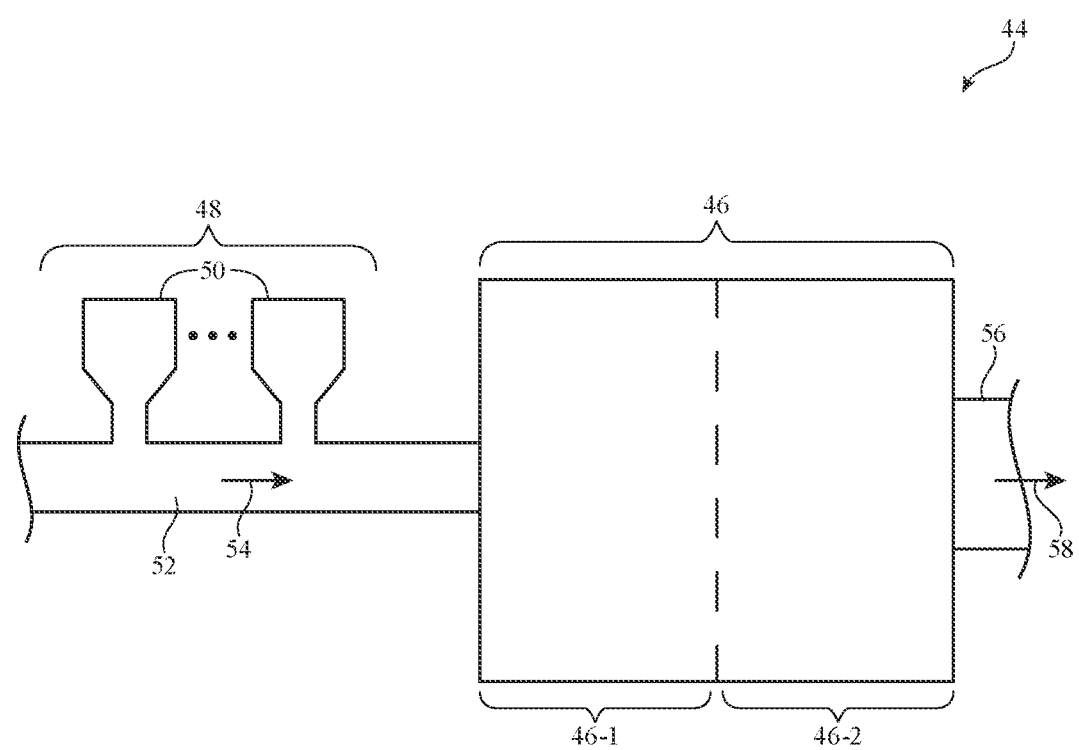
FIG. 6 is a side view of an illustrative extruder that may be used to coextrude two or more different materials in accordance with an embodiment.

An illustrative extrusion tool is shown in FIG. 6. As shown in FIG. 6, extruder 44 may include hoppers 48 that contain different types of material to be extruded (e.g., different polymers). The material from hoppers 48 may be provided in direction 54 to coextrusion die set 46 via conduits 52. During coextrusion, the material from hoppers 50 is coextruded through extrusion die set and forms extruded member 56, which exits extrusion die set 46 in direction 58. Extrusion die set may include one or more layers with channels configured to randomly (pseudorandomly) transversely distribute the material of different refractive indices that has been received from hoppers 48. Die set may, as an example, include distribution plate 46-1 (e.g., a plate with a checkerboard pattern of polymer flow paths) and extrusion die orifice 46-2, which produces extruded member 56. Member 56 may be, as an example, a coextruded preform that may subsequently be drawn to form elongated strands of material (e.g., fibers) in a draw tower.

Figure 7:
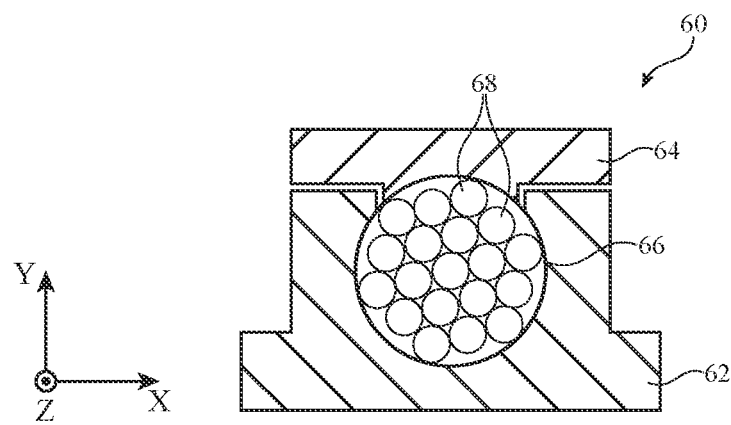
FIGS. 7, 8, and 9 are cross-sectional views of illustrative fusing tools for fusing lengths of fiber or other structures together at a fusion temperature in accordance with embodiments.
Figure 8:
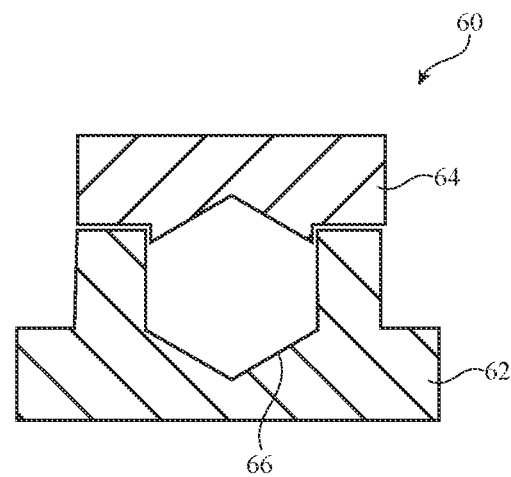
Figure 9:
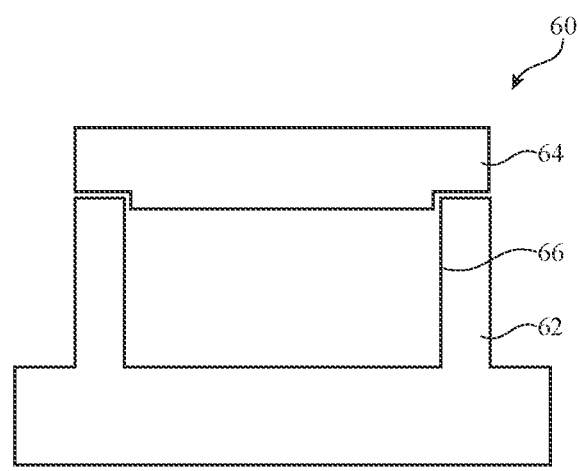

When it is desired to join polymer members (e.g., drawn strands or other elongated polymer members, tiles of material, and/or other polymer structures), the polymer members may be placed in fusion equipment, which fuses the polymer members by applying heat and pressure. An illustrative fusion tool with a circular cross-sectional profile is shown in FIG. 7. As shown in FIG. 7, fusion tool (fuser) 60 may have multiple movable portions such as portion 62 and portion 64. These portions may be opened when it is desired to insert polymer material 68 into opening 66. Polymer material 68 may have any suitable shape. For example, material 68 may include multiple fibers or other strands of material that extends along the Z axis of FIG. 7 (e.g., in a scenario in which opening 66 forms an elongated cylindrical cavity with a longitudinal axis running parallel to the Z axis of FIG. 7), may be a tile or cane of Anderson localization material (e.g., a polymer member with multiple filaments of different refractive index), or may be other suitable polymer material. FIG. 8 shows how opening (cavity) 66 may have a hexagonal cross-sectional profile. FIG. 9 shows how opening (cavity) 66 may have a rectangular cross-sectional profile. Other shapes may be used for fusion equipment cavities, if desired.

Collections of elongated polymer members that are fused together using fusion tools may sometimes be referred to as canes. Canes may have any suitable cross-sectional shapes (hexagonal, rectangular, circular, etc.). The temperature used during fusion (sometimes referred to as the fusion temperature) may be, as an example, greater than the melting point of some or all of the polymer used in forming the structures being fused. Particularly for semicrystalline polymer materials, use of elevated fusion temperatures such as these may help prevent stress from being locked in within the microcrystalline structures of the polymer materials as a result of fusion.

Elongated cylindrical polymer preforms and polymer preforms of other shapes may be formed into elongated strands (e.g., fibers). Equipment such as a draw tower or other equipment for forming elongated polymer into strands may be used. Draw towers may also be used to draw (and thereby elongate) sets of fused fibers (e.g., canes). As part of the drawing process, the lateral dimensions of the drawn material will shrink, so this type of process may help ensure that optical structures (e.g., filaments of different refractive index value) that are used in forming Anderson localization features have desired lateral dimensions (e.g., less than a micron or other suitable size, etc.).

Figure 10:
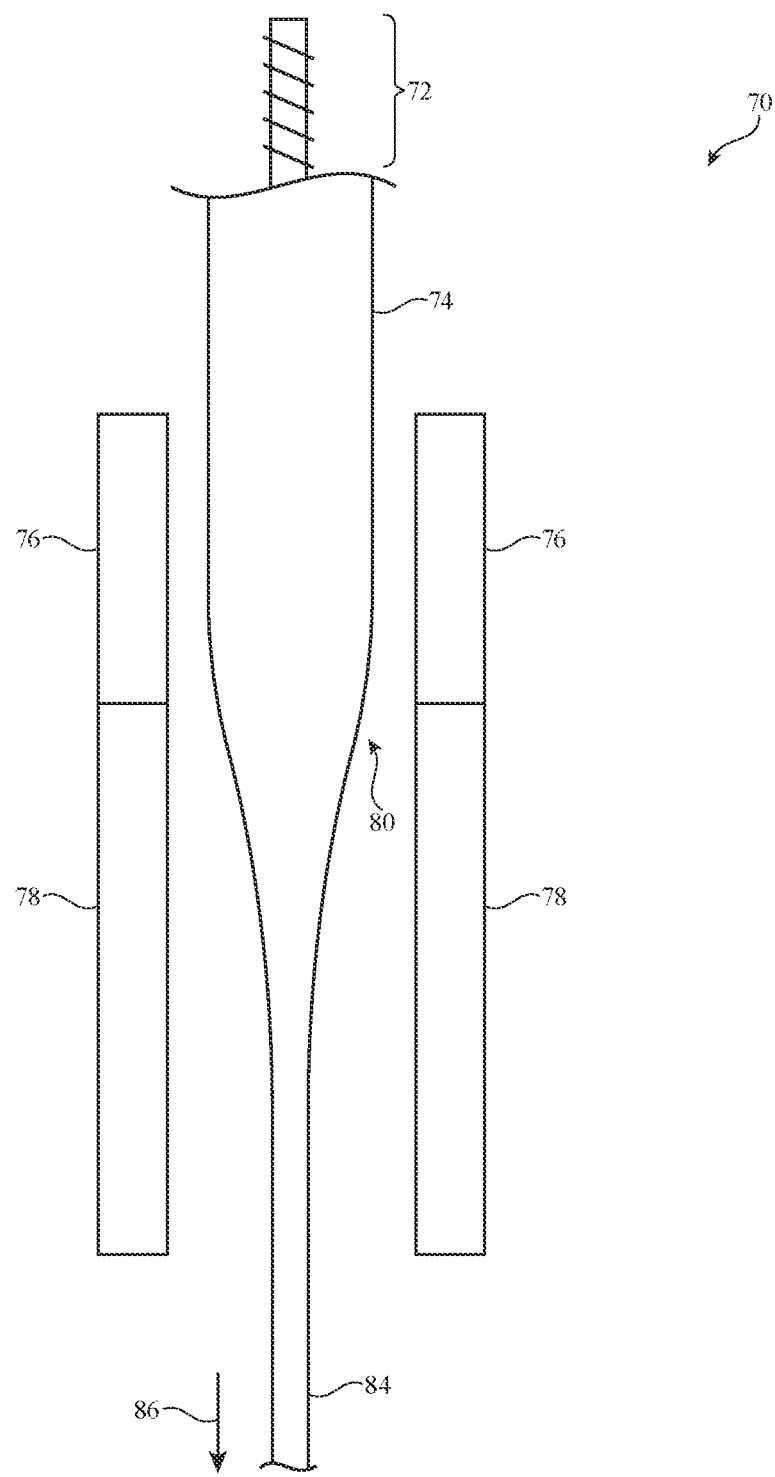
FIG. 10 is a side view of illustrative fiber drawing equipment such as a draw tower in accordance with an embodiment.

An illustrative draw tower is shown in FIG. 10. As shown in FIG. 10, draw tower 70 may have an adjustable feeder 72 such as a feeder based on a computer-controlled screw feed. Feeder 72 may be adjusted to adjust the speed at which preform 74 is lowered between heated walls 76 and 78. Walls 76 and 78 may surround preform 74 radially (e.g., walls 76 and 78 may be cylindrical and preform 74 may, during drawing operations, be lowered into the center of the cylindrical cavity formed by the cylindrical walls). The cylindrical walls may be heated to form an oven that heats preform 74. For example, walls 76 may be heated to a first (preheating) temperature and walls 78 may be heated to a second (hot zone) temperature. The first temperature may be sufficiently high to help preheat preform 74 (e.g., 130° C.) and the second temperature may be a higher working temperature (e.g., 180-200° C.) that causes preform 74 to soften and thereby form neck 80. This allows the polymer material of preform 74 to be drawn out of drawing tower 70 in direction 86 in direction 86 as thin fiber 84. If desired, the draw temperature (working temperature) used in draw tower 70 may be above the melting temperature of the materials being drawn.

In addition to thermal processing tools such as extruders, fusers, and draw towers, Anderson localization material or other material for layer 16 may be processed by machining and/or polishing (e.g., to form peripheral surfaces on layer 16 that curve downward near the periphery of housing 12 as shown in FIG. 1, to polish the surfaces of layer 16 so that they are optically clear, etc.). Finished image transport layer structures (with optional coatings and other additional layers) may be assembled with displays such as display 14 and mounted in housings such as housing 12 to form device 10 of FIG. 1.

With an illustrative arrangement, extruder 44 may be used to perform coextrusion operations on two or more different materials of different refractive indices to produce an elongated member (sometimes referred to as a wire, fiber, or elongated strand) having randomized elongated filaments (e.g., smaller-diameter elongated structures) of two or more different refractive index values.

Figure 11:
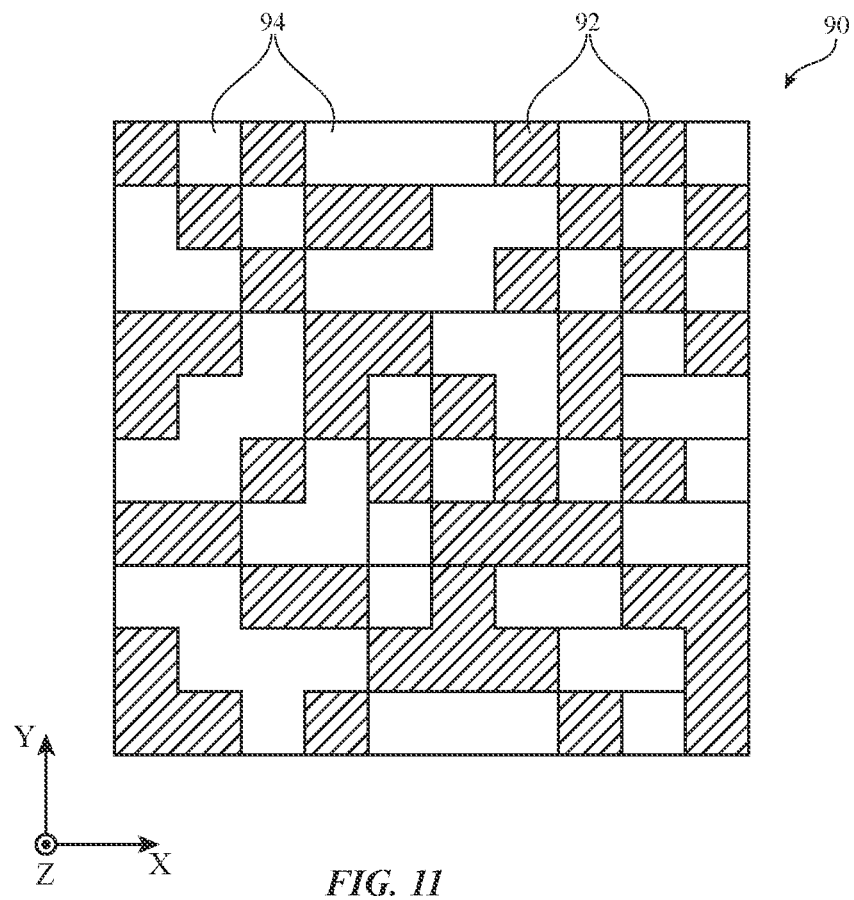
FIG. 11 is a cross-sectional top view of an illustrative extruded elongated structure such as a strand of polymer material with a randomized pattern of regions with different refractive indices in accordance with an embodiment.

Consider, as an example, the arrangement of FIG. 11. Extruded elongated member 90 of FIG. 11 has two or more different types of polymer or other suitable material. These different materials have different refractive index values. Extruded elongated member 90 may be extruded by extruder 44 along the Z axis (e.g., member 90 may have a longitudinal axis that runs into and out of the page). Member 90 is formed from a plurality of elongated portions (sometimes referred to as filaments) that extend along the Z. These filaments may be formed as part of the coextrusion process used in forming member 90.

The filaments in member 90 may include, for example, first filaments 94 interspersed with second filaments 92. First filaments 94 and second filaments 92 may have different respective refractive index values. The locations of filaments 92 and filaments 94 may be randomized laterally within member 90 (e.g., filaments 92 may be located at random locations within the X-Y plane and filaments 94 may be located at the remaining locations within the X-Y plane. By transversely randomizing the refractive index values of portions of member 90, member 90 may be used in form Anderson localization material. The lateral dimensions (in X and Y) for each filament 92 in the undrawn state of member 90 of FIG. 11 may be about 50-150 microns, at least 0.5 microns, at least 1 micron, at least 5 microns, at least 25 microns, at least 100 microns, less than 1500 microns, less than 300 microns, less than 10 microns, less than 5 microns, less than 2 microns, less than 1.5 microns, or other suitable size. The lateral dimensions of member 90 may be about 1 mm, at least 0.1 mm, at least 0.5 mm, less than 2 mm, less than 10 mm, or other suitable size. Although extruded elongated member 90 of FIG. 11 has a square cross-sectional shape, extruded elongated members with other cross-sectional shapes may be used, if desired (e.g., extruded elongated members with hexagonal cross-sectional shapes, circular cross-sectional shapes, etc.). If desired, there may be three, four, or more than four different types of material in the filaments of member 90. For example, a first set of filaments of a first refractive index may be intermixed with second, third, and fourth sets of filaments (and, if desired one or more additional set of filaments) having respectively, different second, third, and fourth refractive index values.

Figure 12:
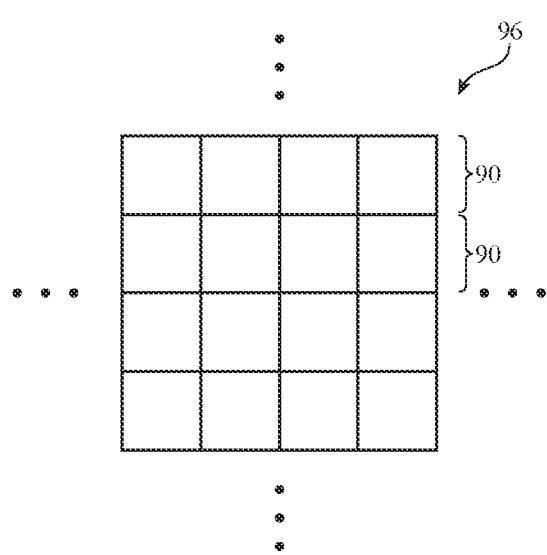
FIG. 12 is a cross-sectional top view of an illustrative preform formed by fusing together multiple elongated coextruded members of the type shown in FIG. 11 in accordance with an embodiment.

After extruding an elongated member such as elongated member 90, fusion tool 60 may be used to fuse together multiple elongated members 90 to form a preform that is elongated along the Z dimension such as elongated preform 96 of FIG. 12. There may be any suitable number of members 90 in preform 96. For example, there may be a sufficient number of members 90 in preform 96 so that each side of preform 96 has a length of 50-150 mm, at least 5 mm, at least 25 mm, less than 1500 mm, less than 300 mm, or other suitable size.

After fusing elongated members 90 to form preform 96, preform 96 may be drawn down to a smaller-diameter elongated strand of material (sometimes referred to as a fiber). For example, preform 96 may be supplied to draw tower 70 of FIG. 10 (e.g., serving as preform 74 of FIG. 10). Draw tower 70 may then be used to draw down preform 96 to a fiber that is about 0.3 mm in diameter or that has other suitable lateral dimensions (e.g., at least 0.03 mm, at least 0.15 mm, less than 0.6 mm, less than 3 mm, etc.). This fiber may have a roughly square cross-sectional shape or other suitable cross-sectional shape and may have optical features that are laterally on the order of about 200-500 nm in size (e.g., the filaments that were coextruded in extruder 44 when forming members 90 may, after being incorporated into preform 96 by fusing members 90 together and after drawing preform 96 into 0.3 mm diameter fibers, be shrunken in diameter to be about 300 nm in size).

Multiple drawn fibers (drawn elongated members) of this type may then be fused together to form a block of Anderson localization material (see, e.g., material 38 of FIG. 3). Any suitable number of fibers may be fused together (e.g. at least 10,000, at least 100,000, at least 1,000,000, at least 10,000,000, fewer than 100,000,000, fewer than 5,000,000, fewer than 500,000, etc.). A desired shape for the Anderson localization material may be formed during fusion and/or during post-processing (e.g., slicing the material into a layer, polishing, subsequent slumping, molding, etc.). As an example, the fusion tool that is used in deforming may be used to deform the elongated filaments in the Anderson localization material in a deformed shape of the type shown by deformed optical structures 16F of layer 16 of FIG. 1. Grinding, polishing, and other operations may be used to form low-haze surfaces on the Anderson localization material and desired cross-sectional profiles (e.g., curved edge profiles of the type shown in FIG. 1), thereby forming a finished version of layer 16 of FIG. 1. Layer 16 may then be installed within device 10.

Figure 13:
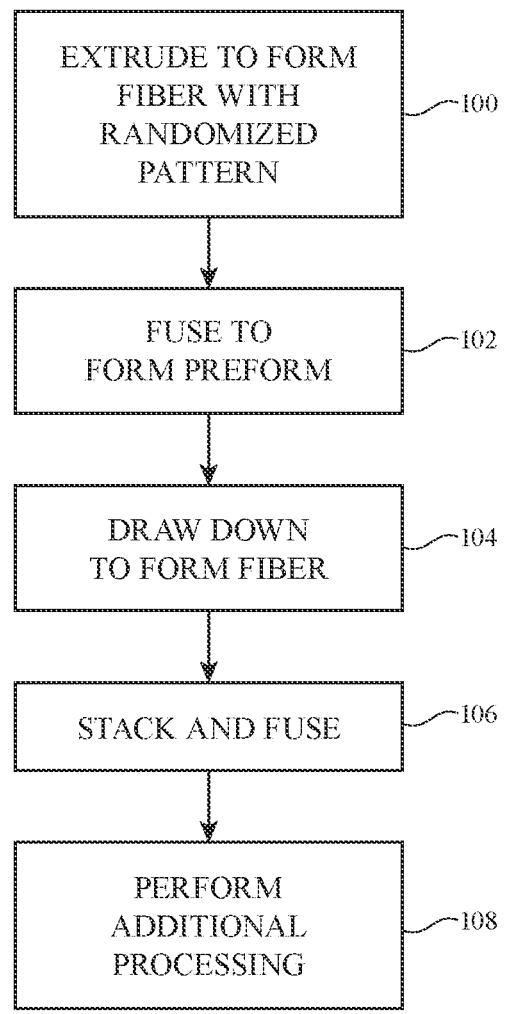
FIG. 13 is a flow chart of illustrative steps involved in forming an image transport layer for an electronic device display in accordance with an embodiment.

Illustrative operations involved in forming layer 16 and device 10 are shown in FIG. 13.

During the operations of block 100, extruder 44 may be used to form an elongated member such as member 90 of FIG. 11 that has transversely randomized areas of different refractive index values (e.g., extruder 44 may coextrude different polymers to form a member with filaments of different refractive indices such as illustrative filaments 92 and 94 of FIG. 11).

During the operations of block 102, multiple elongated members 90 may be fused together to form elongated preform 96 of FIG. 12.

Draw tower 70 may then be used to draw the preform down to a narrower fiber (see, e.g., the operation of block 104).

During the operations of block 106, the drawn fibers may be stacked into a cavity within a fusion tool. Under heat and pressure, the fusion tool may fuse the drawn fibers together to form Anderson localization material of a desired shape (e.g., a block of material that can be sliced to form layers, a deformed member such as a block of material with optical structures such as filaments 92 and 94 that have been deformed as illustrated by deformed fibers 16F of layer 16 of FIG. 1, etc.).

If desired, multiple drawing operations may optionally be performed. For example, a first drawing operation may be performed followed by a first fusion operation and then a second drawing operation may be performed followed by a second fusion operation. Additional drawing and fusion operations may also be performed, if desired. During each fusion operation, multiple elongated structures are joined together to enlarge the overall lateral size of the structures and during each drawing operation, the structures are elongated along the longitudinal axis of the structure and are thereby reduced in lateral size.

During the operations of block 108, additional processing operations may be performed on the block of Anderson localization material. For example, slicing tools may be used to slice the block into one or more layers. Grinding tools may be used to grind the surfaces of the layers into desired shapes. Polishing tools may be used to polish the surfaces to form smooth low-haze surfaces through which images may be viewed. Protective coatings may be added and/or layer 16 may optionally be laminated to one or more additional layers. Layer 16 may then be coupled to housing 12 to form device 10 using adhesive, gaskets, fasteners, and/or other display cover layer mounting structures.

Figure 14:
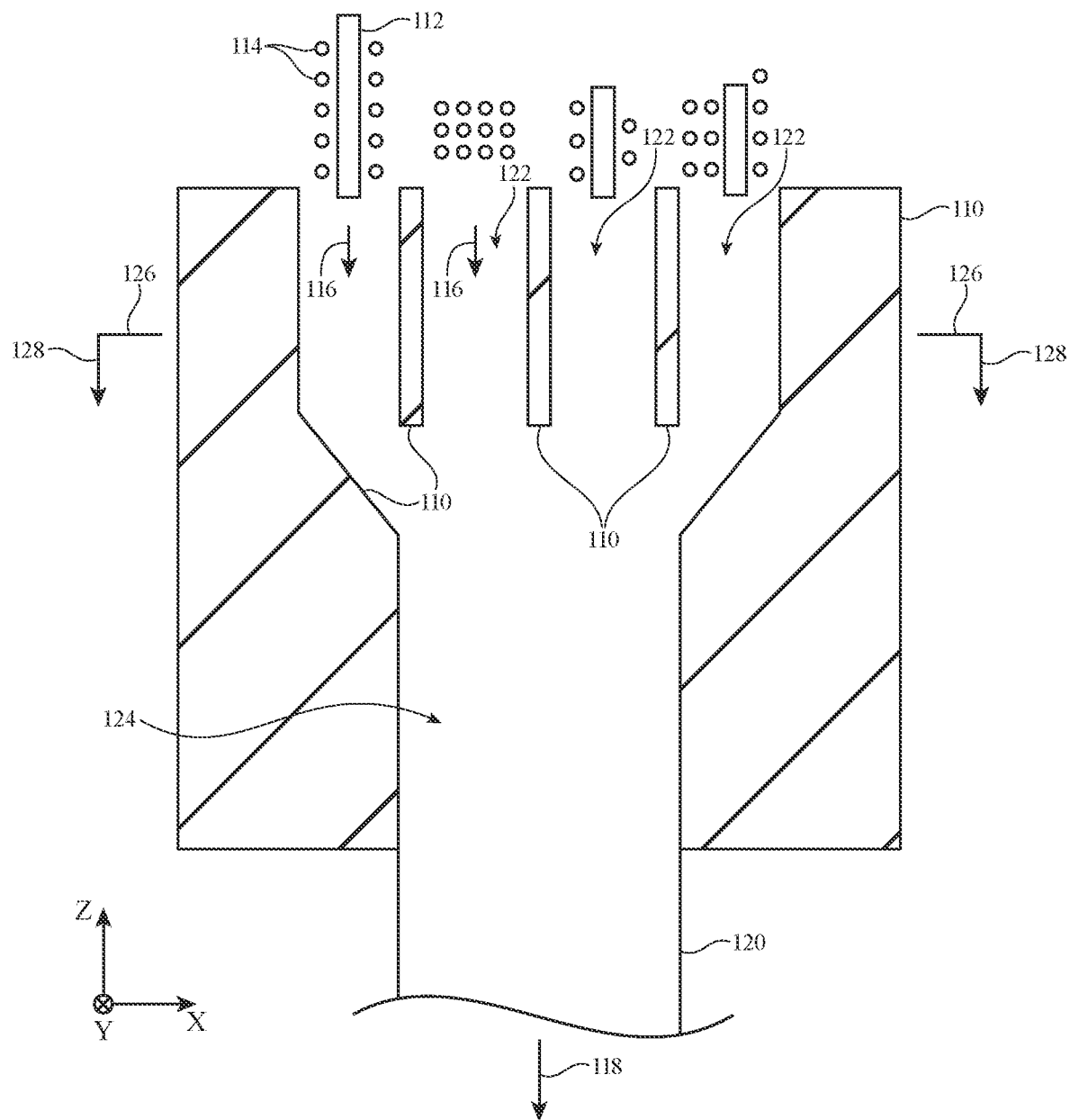
FIG. 14 is a diagram of an illustrative tool such as a heated mold or other tool with heated walls for heating preform materials to form a preform in accordance with an embodiment.

If desired, transparent materials with different refractive index values (e.g., polymers) may be formed into a preform from which fibers may be drawn using a heated mold of the type shown in FIG. 14. As shown in FIG. 14, polymers of different refractive index values (e.g., polymer pellets 114 of one or more different refractive index values interspersed with elongated polymer bars 112 of one or more different refractive index values) may be received within multiple inlets 122 of mold 110. Some inlets 122 may contain only pellets and some inlets 122 may contain a bar surrounded by pellets (as examples).

Bars 112 may have elongated shapes with longitudinal axes that extend vertically through the cavities in mold 110, so that the refractive index of the material in mold 110 is randomized transversely (in the X-Y plane) but is relatively invariant along columns of material formed in the Z direction. Within mold 110, inlets 112 may be joined together at outlet 124, so that polymer received in direction 116 within inlets 122 can exit mold 110 as preform 120 in direction 118. By molding together polymer structures (pellets, bars, etc.) of various configurations and various refractive index values, a preform for fiber drawing may be formed that is characterized by laterally randomized and longitudinally invariant refractive index structures. Preform 120 may have any suitable shape and size. As an example, preform 120 may be cylindrical in shape with a circular cross-section and may have a diameter of 10-20 cm. If desired, mold 110 may have other configurations (e.g., mold 110 may have an internal cavity into which polymer materials are placed before heating and molding operations are used to form preform 120, etc.). The example of FIG. 14 in which polymer materials such as pellets 114 and bars 112 are introduced into mold 110 via inlets 122 is illustrative.

Figure 15:
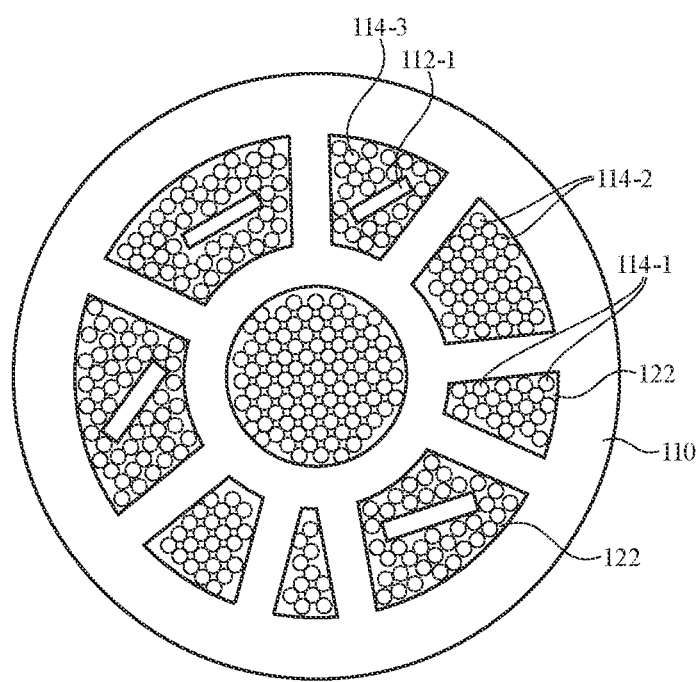
FIGS. 15, 16, and 17 are cross-sectional views of illustrative preform structures in accordance with embodiments.

Inlets 122 may have any suitable shape. A cross-sectional view of mold 110 of FIG. 14 taken along line 126 and viewed in direction 128 is shown in FIG. 14. As shown in FIG. 15, mold 110 may have a series of cavities forming inlets 122 that are separated by intervening mold walls (e.g., metal walls). Polymer bars 112 may be introduced into inlets 122 amongst polymer pellets 114 that have refractive index values that are different than the bars. Adjacent inlets 122 may also have polymer materials that differ in refractive index. As an example, pellets 114-1 may have a different refractive index value than pellets 114-2. The refractive index value of bars 112 may be the same as that of some of pellets 114. For example, bar 112-1 may have the same refractive index as pellets 114-2. The pellets surrounding each bar may have a refractive index that differs from that bar. For example, pellets 114-3 may have a different refractive index than bar 112-1 (and may have the same refractive index as pellets 114-1).

Figure 16:
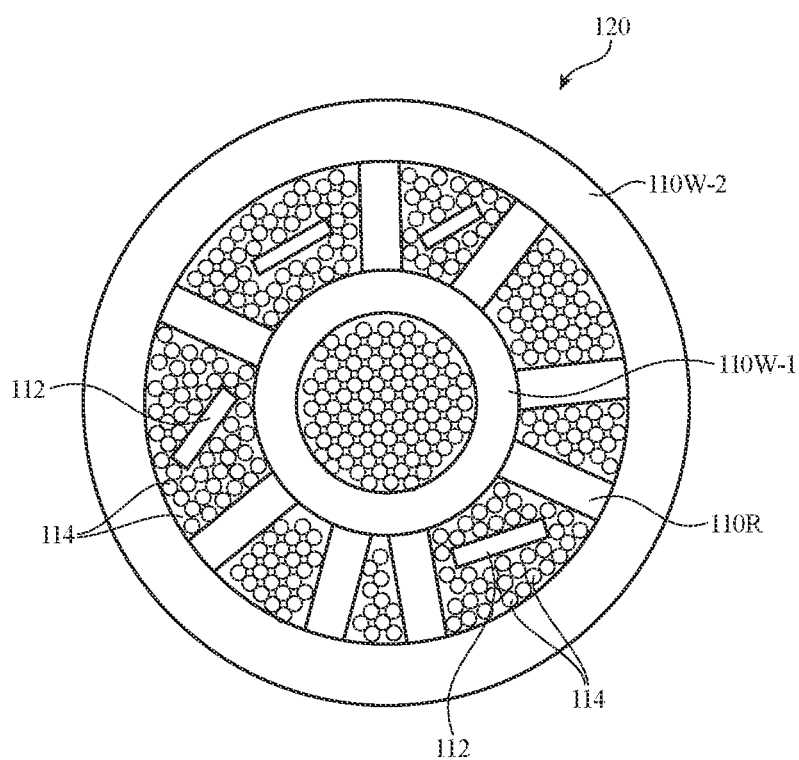

Another illustrative arrangement for forming a polymer preform with transversely randomized areas of different refractive index (and different polymer materials) is shown in FIG. 16. In the example of FIG. 16, radially extending polymer inner walls 110R extend between inner polymer cylindrical wall 110 W-1 and outer polymer cylindrical wall 110 W-2. The polymer walls create longitudinally extending cavities within the cylindrical polymer structure for receiving polymer pellets, polymer bars, and other polymer materials. Extrusion or other techniques may be used in forming the cylindrical polymer structure with cylindrical walls and other wall structures for forming the separate elongated longitudinally extending openings with the cylindrical polymer structure. To form a preform for drawing fiber, polymer structures such as polymer pellets and/or elongated polymer bars may be placed into the elongated cavities formed within the cylindrical polymer structure and these polymer materials may be formed into a preform by heating.

The refractive index of wall 110 W-1 may be the same as the refractive index of wall 110 W-2 or may differ. Walls 110R may have the same refractive index as walls 110 W-1 and 110 W-2 or may have a different refractive index. The refractive indices of pellets 114 may vary between adjacent compartments separated by walls 110R and may differ from the refractive index values of walls 110R, 110 W-1 and/or 110 W-2. With this type of arrangement, preform 120 may be formed without passing individual areas of preform 120 through separate inlets in mold 110 of FIGS. 14 and 15.

Figure 17:
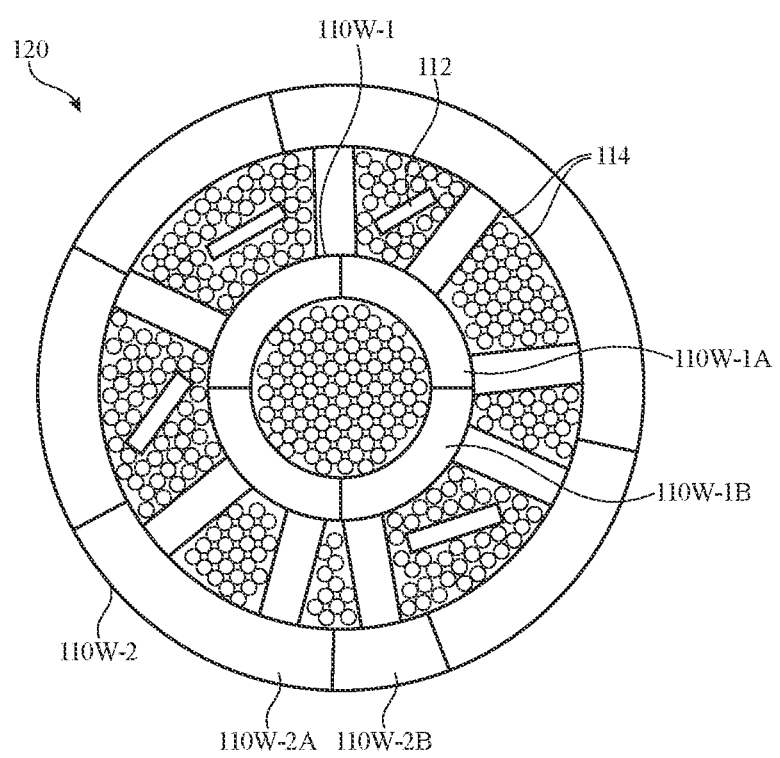

If desired, polymer cylindrical walls 110 W-1 and 110 W-2 for preform 120 may be segmented along the circumference of the cylindrical walls and may have refractive index values that differ between adjacent segments as shown in FIG. 17 (e.g., so that segment 110 W-2A and adjacent segment 110 W-2B of outer cylindrical polymer wall 110 W-2 are formed from different polymer materials with different respective refractive indices and so that segments 110 W-1A and 110 W-1B of inner wall 110 W-1 have different index values). This type of arrangement, and/or arrangements of the type shown in FIG. 16 may be used in forming preforms such as preform 120 without using metal molds with separate inlets for receiving pellets 114 and bars 112.

After forming polymer preforms of the type shown in FIGS. 14, 16, and 17, the polymer preforms may be processed as described in connection with the flow chart of FIG. 13. For example, preforms may be drawn into fibers using a draw tower (e.g., to form fibers of about 200-400 microns in diameter, at least 20 microns in diameter, at least 100 microns in diameter, less than 800 microns in diameter, less than 4000 microns in diameter, or other suitable diameter), lengths of the fibers (e.g. fiber segments that are at least 1 cm long, at least 100 cm long, at least 10,000 cm long, less than 1000 cm long, less than 300 cm long, less than 50 cm long, or other suitable length) may be stacked and fused in a fuser to form a block of Anderson localization material, and the block of Anderson localization material may be ground using a grinding tool, polished using a polishing tool, and attached to housing structures in device 10 to serve as a display cover layer for display 14 (e.g., the Anderson localization material may be subjected to additional processing to form layer 16 and device 10).

If desired, protective layers (e.g., glass layers, thin-film coatings, and/or other layers of material) may be added to the inner and/or outer surfaces of layer 16 and/or layer 16 may be coupled to additional layer(s) of glass, polymer, crystalline material such as sapphire, or other material. Layer 16 may also include Anderson localization material formed from glass, crystalline material such as sapphire, and/or other transparent material. The use of polymers in forming layer 16 is presented as an example.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. A method of forming a display cover layer for an electronic device display, comprising:
   with an extruder, extruding elongated members each having areas of transversely randomized refractive index associated with a plurality of corresponding elongated filaments, wherein the elongated members comprise polymer materials with respective melting temperatures;
   with a fuser, fusing together the elongated members to form a preform;
   in a draw tower, drawing the preform down to form a fiber at a temperature that is larger than the melting temperatures; and
   fusing together lengths of the fiber to form material for the display cover layer.

2. The method defined in claim 1 wherein the material for the display cover layer comprises Anderson localization material, the method further comprising grinding and polishing the Anderson localization material to form the display cover layer.

3. The method defined in claim 1 wherein extruding the elongated member comprises extruding an elongated polymer member having areas with at least two different refractive index values.

4. The method defined in claim 1 wherein fusing together the elongated members comprises using the fuser to fuse together the polymer elongated members at a temperature greater than the melting temperatures.

5. The method defined in claim 1 and wherein fusing together the lengths of polymer fiber to form the material for the display cover layer comprises fusing together the lengths of the polymer fiber at a temperature above the melting temperatures to form Anderson localization material for the display cover layer.

6. The method defined in claim 1 wherein extruding the elongated members comprises extruding elongated members with elongated filaments having square cross-sectional shapes.

7. The method defined in claim 6 wherein the elongated members have lateral dimensions of 0.1 mm to 10 mm, wherein the preform has lateral dimensions of 5 mm to 500 mm, and wherein the lengths of fiber have lateral dimensions of 0.03 to 3 mm.

8. A method of forming Anderson localization material, comprising:

with an extruder, extruding elongated members each having areas of transversely randomized refractive index associated with a plurality of corresponding elongated filaments;

fusing together the elongated members to form a preform;

in a draw tower, drawing the preform down to form a fiber, wherein drawing the preform down to form the fiber comprises lowering the preform between first heated walls and second heated walls in that order, wherein the first heated walls are heated to a first temperature and the second heated walls are heated to a second temperature that is greater than the first temperature; and fusing together lengths of the fiber to form the Anderson localization material.

9. The method defined in claim 8 wherein the elongated members include first polymer filaments of a first refractive index and a first melting temperature and second polymer filaments of a second refractive index that is different than the first refractive index and a second melting temperature and wherein extruding the elongated members comprises extruding the elongated members at an extrusion temperature above the first and second melting temperatures.

10. The method defined in claim 9 wherein the second temperature is above the first and second melting temperatures.

11. The method defined in claim 10 wherein fusing together the lengths of the fiber comprises fusing together the lengths of the fiber in a fusion tool at a fusion temperature above the first and second melting temperatures.

12. The method defined in claim 10 wherein fusing together the elongated members comprises:

with a fusing tool, fusing together the elongated members at a fusion temperature above the first and second melting temperatures.

* * * * *